E. F. CHEWNING.
IMPLEMENT FOR MAKING IRRIGATING CHANNELS.
APPLICATION FILED NOV. 24, 1920.
1,397,722.
Patented Nov. 22, 1921.
2 SHEETS—SHEET 1.
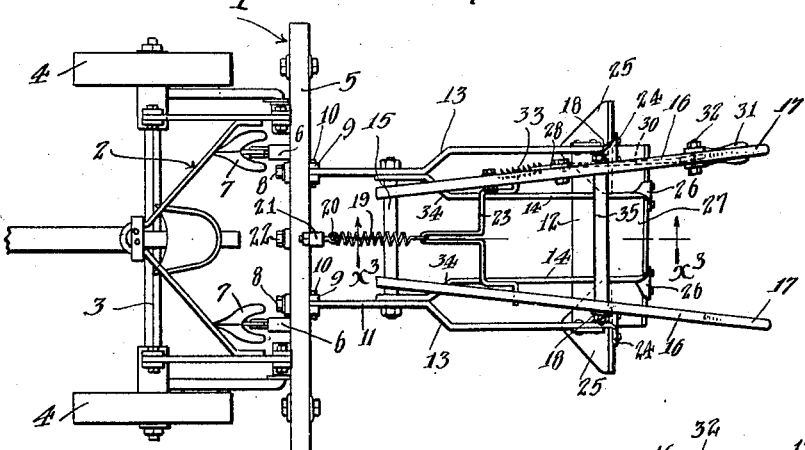
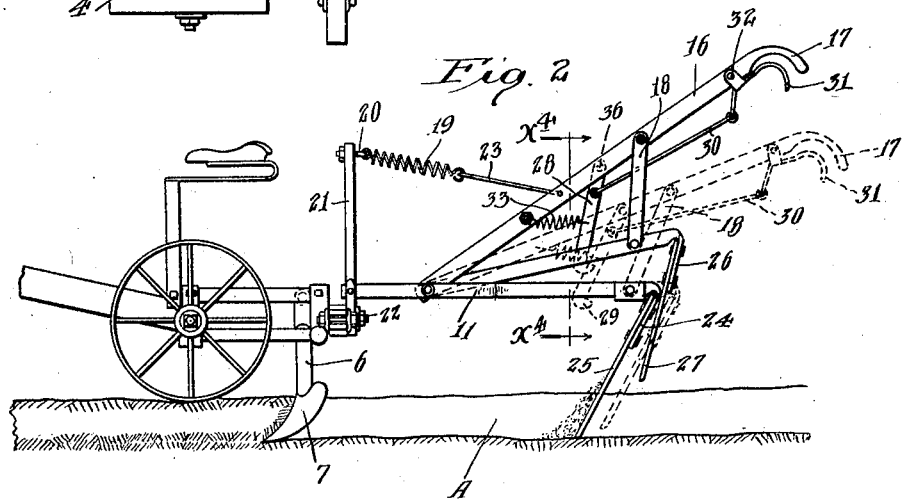
INVENTOR.
Eugene F. Chewning
BY
ATTORNEY E. F. CHEWNING.
IMPLEMENT FOR MAKING IRRIGATING CHANNELS.
APPLICATION FILED NOV. 24, 1920.
1,397,722.
Patented Nov. 22, 1921.
2 SHEETS—SHEET 2.
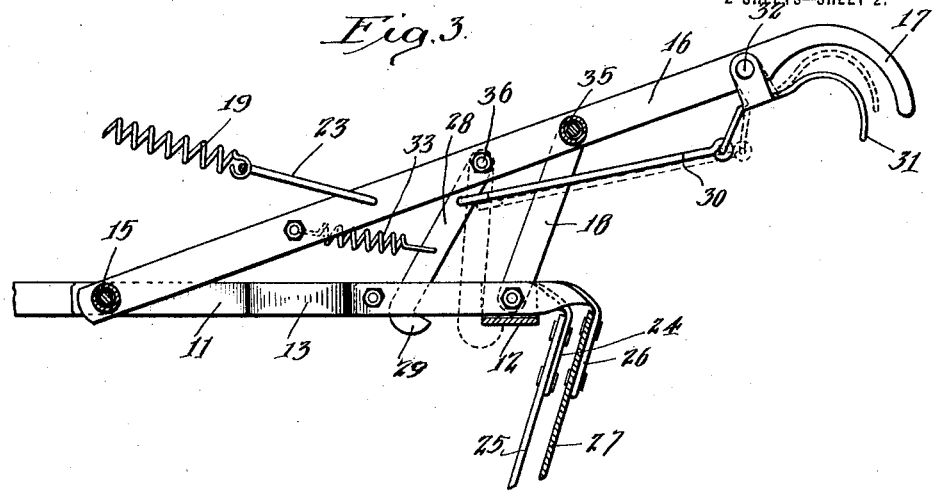
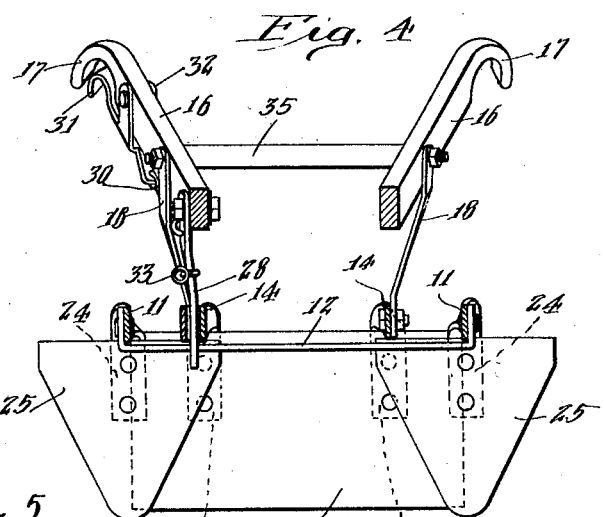
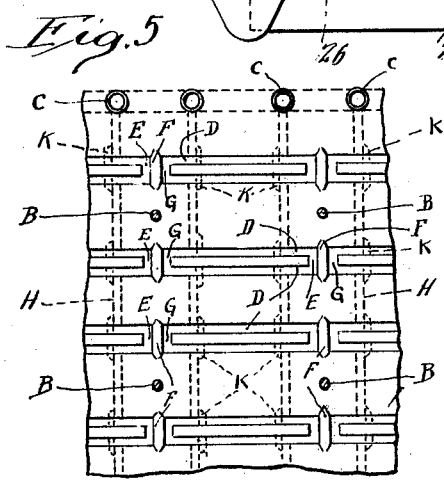
INVENTOR.
Eugene F. Chewning.
BY
ATTORNEY

UNITED STATES PATENT OFFICE.

EUGENE F. CHEWNING, OF SAN DIMAS, CALIFORNIA, ASSIGNOR OF ONE-HALF TO WILL G. FIELDS, OF SAN DIMAS, CALIFORNIA.

IMPLEMENT FOR MAKING IRRIGATING-CHANNELS.

1,397,722. Specification of Letters Patent. Patented Nov. 22, 1921.

Application filed November 24, 1920. Serial No. 426,280.

*To all whom it may concern:*

Be it known that I, EUGENE F. CHEWNING, a citizen of the United States, and a resident of San Dimas, in the county of Los Angeles and State of California, have invented certain new and useful Improvements in Implements for Making Irrigating-Channels, of which the following is a specification.

The principal object of the invention is to form irrigating channels by machine instead of by hand labor.

Another object of the invention is to improve the implement patented to J. A. Dennis and H. S. Gilman, May 23, 1916, No. 1,184,329. With this patented implement, it is necessary for the operator who sits on the cultivator to operate the plow-raising and lowering means to turn his head around in order to note the places at which it is necessary for him to operate the plow-raising and lowering means to properly form the furrows or channels and the dams and cross channels. With my construction, the operator walks behind the implement and from that position operates the furrow-engaging members and blocker or cross-furrow forming member.

Another object is to make provision for mechanical lifting of the furrow engaging member and also the blocker when it is desired to withdraw them from the earth.

The accompanying drawings illustrate the invention:

Figure 1 is a plan view of an implement embodying the invention;

Fig. 2 is a front elevation of Fig. 1, a furrow also being indicated;

Fig. 3 is an enlarged longitudinal section on the line indicated by $x^3$—$x^3$, Fig. 1;

Fig. 4 is an enlarged cross section on the line indicated by $x^4$—$x^4$, Fig. 2; and Fig. 5 is a more or less diagrammatic plan view of a portion of an orchard or grove showing the channels formed by the implement when in use.

The invention may be embodied as a portion of an ordinary cultivator, when the cultivator is manufactured, or the invention may be built as an attachment which can be supplied to the owner of the cultivator and readily assembled with the cultivator without the employment of any very great degree of mechanical skill.

A cultivator of the ordinary well known type is indicated in general by the character 1 and comprises a frame 2 mounted on an axle 3 supported by wheels 4. The frame 2 carries a cultivator beam 5 to which are attached standards 6 carrying plows 7. The plows 7 constitute the initial furrow or channel-forming members and one of the longitudinal channels formed by the cultivator is indicated at A in Fig. 2.

The invention will now be described: Secured to the cultivator beam 5 by bolts or other suitable fastenings 8 are brackets 9 and pivoted at 10 to said brackets are arms 11 connected to one another near their rear ends by a cross member 12. The rear portions of the arms 11 are offset outwardly from the front portions of said arms by bends 13.

To the arms 11 forward of the bend 13 are pivoted arms 14, the pivot being indicated at 15, and, in this instance, said pivot connects the arms 11 to one another. The rear portions of the arms 14 are offset inwardly from the front portions by bends 34. The pivot 15, in this instance, rotates in the arms 11, and to said pivot are secured the forward ends of operating members 16 provided at their rear ends with handles 17 which, in practice, are grasped by the operator as he walks behind the implement. The members 16 are connected by upright members 18 to the arms 14 so that swinging upwardly of the operating members 16 will raise the arms 14.

The arms 16 are normally held in raised position by a spring 19 which is connected at its forward end by an eye-bolt 20 or other suitable fastening to the upper end of a post 21 which is secured by a bolt 22 to the middle portion of the cultivator beam 5. The rear end of the spring 19 is connected by a cross link 23 to the operating members 16, said link having its ends journaled in the operating members. The normal positions of the operating members 16 and arms 14 are as shown in solid lines in Fig. 2.

The rear ends of the arms 11 are downwardly bent as indicated at 24 and secured to said rear ends are furrow-engaging members 25 of more or less triangular shape. The members 25 normally engage the furrows as shown in solid lines in Fig. 2.

The arms 14 are downwardly bent at their rear ends as shown at 26 and secured to said ends is a blocker and cross-furrow or channel forming blade 27 which is normally held in the raised position, shown in solid lines in Fig. 2 of the drawings, by reason of the tension of the spring 19.

Means are provided for connecting the arms 11 to the operating members 16 at will so that the tension of the spring 19 will also function to raise the furrow-engaging members 25 from the furrows. Such means include the cross member 12 and also a latch 28 having a hook 29 at its lower end to engage beneath the cross member 12. The latch 28 is pivoted at 36 to one of the operating members 16 and the latch is operated into latching position by a link 30 connected to an operating lever 31 pivoted at 32 to that member 16 to which the latch is pivoted. The operating lever 31 is positioned immediately beneath the handle 17 of the associated operating member 16 so as to be conveniently grasped by the fingers of the operator while he also grasps the handle 17. The latch 28 is normally held out of latching position by a spring 33 connected at one end to the latch and at its opposite end to the member 16 with which the latch is associated. The normal position of the latch 28 is shown in solid lines and also in broken lines in Fig. 2 of the drawings. The operating members 16 are preferably connected to each other by a cross member 35.

The implement operates in the following manner: In Fig. 5 is shown a plan view of a portion of an orchard, the trees being indicated at B in cross section and the stand pipes for supplying the water for irrigating being shown at C. It is to be understood that the implement may be operated in various ways so as to produce any desired pattern of irrigating channels, and that the production of the particular pattern is simply typical. In the instance shown in Fig. 5, it will be assumed that the implement passes from left to right and that during such passage the plows 7 form continuous parallel furrows with a ridge of earth lying between adjacent furrows.

Beginning at the left of Fig. 5, the various parts of the implement will be in the positions shown in solid lines in Fig. 2. That is to say, the furrow-engaging members 25 will be running in the furrows so as to clean loose dirt from the furrows, the dirt being dragged or pushed forwardly by the members 25. The longitudinal channels thus formed are indicated at D in Fig. 5. When the implement has progressed to a point which is almost in alinement with a row of the trees, the operator depresses the operating members 16 to cause the blade 27 to cut the cross channel E, and he will then operate the latch 28 to lock the arms 11 to the members 16 and he will thereupon allow the members 16 to be raised by the spring 19 or he may assist the spring in thus raising the member 16 and arms 11, 14. This elevates the furrow-engaging members 25 and the blade 27 to cause the earth collected by the members 25 and blade 27 to be deposited to form a cross-dam or dike F.

Then the operator will depress the operating members 16 to cause the furrow-engaging members 25 and blade 27 to enter the earth to form the cross channel G and at the same instant he will release the latch 28 so as to unlock the arms 11 from the operating members. As soon as the cross channel G has been formed, the operator will raise or allow the spring 19 to raise the members 16 to withdraw the blade 27 from the earth. The furrow-engaging members 25, however, will continue in the lowered position to form the longitudinal parallel channels D, as before.

The implement will continue to be operated as described above to form channels throughout the orchard or grove between the tree rows extending paralled to the row of stand pipes C, and then other channels indicated in broken lines H will be cut by another implement to connect together the channels D on opposite sides of the different rows of trees. Said other implement also blocks or dams the channels D, as indicated at K, so that the water entering the channels D from the channels H will flow into the channels E, G, nearest to the channels H and not run through those portions of the channels D remote from the trees B.

I claim:

1. In an implement of the character described, the combination of pivotally mounted arms, other arms pivoted to the first arms, an operating member connected with the second arms, means to operatively connect the first arms to the operating member at will, channel-engaging members carried by the first arms, respectively, and a channel-forming member carried by the second arms.

2. In an implement of the character described, the combination of pivotally mounted arms, some of the arms carrying channel-engaging members and other of the arms carrying a blade adapted to enter the earth between the channels formed by said members, means to move the arms carrying the blade upwardly, and means to connect the arms carrying the channel-engaging members to the arm-moving means at will.

3. In an implement of the character described, the combination of pivotally mounted arms, other arms pivoted to the first arms, an operating member connected with the second arms, a spring yieldingly holding the operating member in elevated position, means to operatively connect the first arms to the operating member at will, channel-engaging members carried by the first arms, respectively, and a channel-forming member carried by the second arms.

4. In an implement of the character described, the combination with the beam of a cultivator, of arms pivotally connected with said beam, other arms pivoted to the first arms, operating members connected with the second arms and extending rearwardly beyond the rear ends of the arms, channel-engaging members carried by the first arms, means to connect the first arms to the operating members at will, and a channel-forming blade carried by the second arms.

5. In an implement of the character described, the combination with a cultivator, of channel-engaging and channel-forming members operatively connected with the cultivator and positioned rearwardly thereof, and means including a single operating member extending rearwardly of the channel-engaging and channel-forming members to raise said members together above the surface of the earth and to raise the channel-engaging member independently of the channel-forming member.

6. In an implement of the character described, the combination with a cultivator, of channel-engaging and channel-forming members operatively connected with the cultivator and positioned rearwardly thereof, operating means connected with the channel-forming member and extending rearwardly thereof, and means to connect the channel-engaging members to the operating means at will.

7. In an implement of the character described, the combination with a cultivator, of channel-engaging and channel-forming members operatively connected with the cultivator and positioned rearwardly thereof, operating means connected with the channel-forming member and extending rearwardly thereof, means yieldingly holding the operating means in elevated position, and means to connect the channel-engaging members to the operating means at will.

8. In an implement of the character described, the combination with a cultivator, of channel-engaging and channel-forming members operatively connected with the cultivator and positioned rearwardly thereof, means yieldingly holding the channel-forming member normally in raised position and including an operating member for depression of the channel-forming member to engage the earth, and means to connect the operating member to the channel-engaging members at will.

9. In an implement of the character described, the combination with a cultivator, of channel-engaging and channel-forming members operatively connected with the cultivator and positioned rearwardly thereof, means yieldingly holding the channel-forming member normally in raised position, and means to connect the channel-engaging members to the holding means at will.

Signed at Los Angeles, California, this 18th day of November 1920.

EUGENE F. CHEWNING.

Witnesses:
 GEORGE H. HILES,
 L. BELLE WEAVER.